(12) United States Patent
Kartusch et al.

(10) Patent No.: US 12,344,726 B2
(45) Date of Patent: Jul. 1, 2025

(54) THERMAL STABILIZER FOR POLYESTER

(71) Applicant: TREIBACHER INDUSTRIE AG, Treibach-Althofen (AT)

(72) Inventors: Christiane Kartusch, Klagenfurt (AT); Anton Auer, Metnitz (AT); Erich Rack, Völkermarkt (AT)

(73) Assignee: TREIBACHER INDUSTRIE AG, Treibach-Althofen (AT)

( * ) Notice: Subject to any disclaimer, the term of this patent is extended or adjusted under 35 U.S.C. 154(b) by 609 days.

(21) Appl. No.: 17/760,542

(22) PCT Filed: Oct. 14, 2020

(86) PCT No.: PCT/EP2020/078824
§ 371 (c)(1),
(2) Date: Mar. 15, 2022

(87) PCT Pub. No.: WO2021/074178
PCT Pub. Date: Apr. 22, 2021

(65) Prior Publication Data
US 2022/0356324 A1    Nov. 10, 2022

(30) Foreign Application Priority Data
Oct. 15, 2019    (EP) .................................... 19203384

(51) Int. Cl.
*C08K 3/22* (2006.01)
*C08G 63/183* (2006.01)
*C09K 15/02* (2006.01)

(52) U.S. Cl.
CPC .............. *C08K 3/22* (2013.01); *C08G 63/183* (2013.01); *C09K 15/02* (2013.01); *C08K 2003/2213* (2013.01)

(58) Field of Classification Search
None
See application file for complete search history.

(56) References Cited

U.S. PATENT DOCUMENTS 3,621,074 A    11/1971   Seckmauern et al.

FOREIGN PATENT DOCUMENTS

| CN | 102086298 A | 6/2011 | |
|---|---|---|---|
| CN | 102174220 | 9/2011 | |
| CN | 102174220 A | 9/2011 | |
| CN | 106279646 | 1/2017 | |
| JP | 2018159005 A | 10/2018 | |
| KR | 20170063159 | 6/2017 | |
| WO | WO-0140365 A1 * | 6/2001 | ............. C08K 3/013 |
| WO | WO2019191574 | 10/2019 | |

OTHER PUBLICATIONS

Machine translation of Kong et al. CN-102174220-A (Year: 2011).*
Machine translation of Baierweck et al. WO-0140365-A1 (Year: 2001).*
"Infinite Chemistry", edited by Zhang Xia, Metallurgical Industry Press, p. 290, published in Aug. 2015.
"Summary of the West German, Organosilicon Delegation's Technical Symposium in China", edited by the Science and Technology Information Research Institute of the Ministry of Chemical Industry, p. 76, published in May 1980.
International Search Report and Written Opinion received for PCT Patent Application No. PCT/EP2020/078824, mailed on Nov. 4, 2020, 10 pages.
Chinese Second Office Action for Chinese Application No. 202080070123.6, dated Jun. 16, 2023, 11 pages with translation.
International Search Report issued in PCT/EP2020/078824 dated Apr. 11, 2020.
Wei Yang, Zhenghe Jiang, Jie Yang, Benhong Yang, Hongdian Lu: "Preparation of thermoplastic Polyester Elastomer/ Cerium Carbonate Hydroxide Composites Containing Aluminum Phosphinate with Improved Flame-Retardant and Mechanical Properties", Ind. Eng. Chem. Res, vol. 54, 44, Oct. 21, 2015.
El Fray et al., "Influence of ceria nanoparticles on chemical structure and properties of segmented polyesters", Materials Science and Engineering C, vol. 53, Apr. 15, 2015, pp. 15-22.

* cited by examiner

Primary Examiner — Robert T Butcher
(74) Attorney, Agent, or Firm — Workman Nydegger

(57) ABSTRACT

Polymeric composition comprising a thermoplastic polyester and a rare earth compound selected from the group consisting of lanthanum hydroxide, cerium oxide hydrate and mixtures thereof, characterized in that the amount of the thermoplastic polyester in the polymeric composition is more than 50 wt. %, preferably more than 70 wt. %.

4 Claims, 1 Drawing Sheet

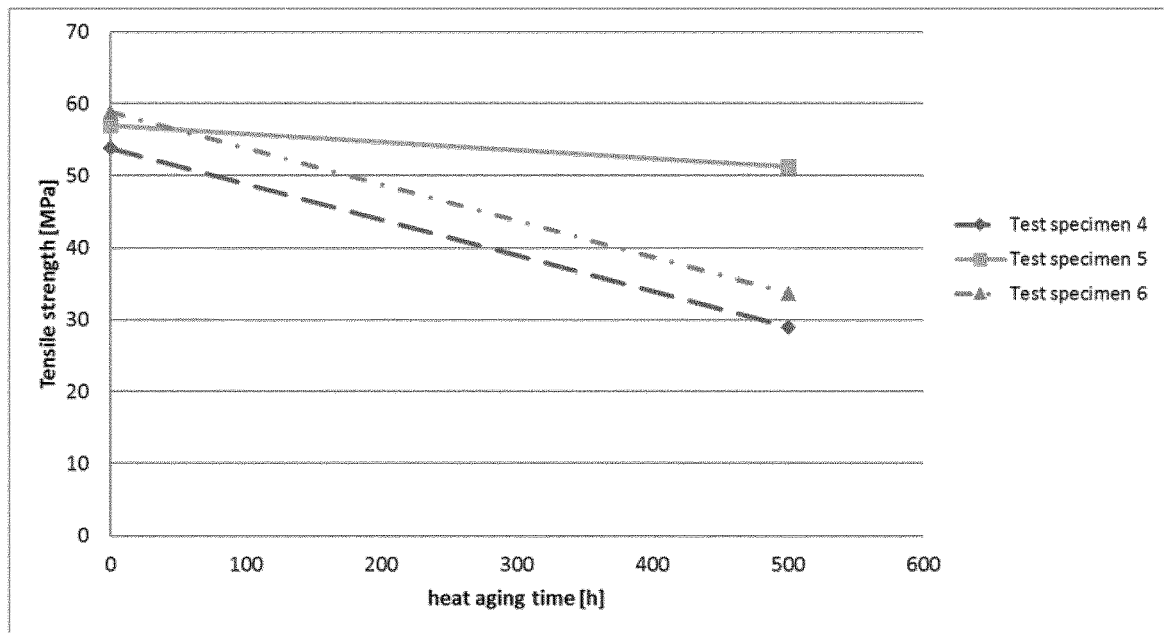
Fig. 1A (170 °C)
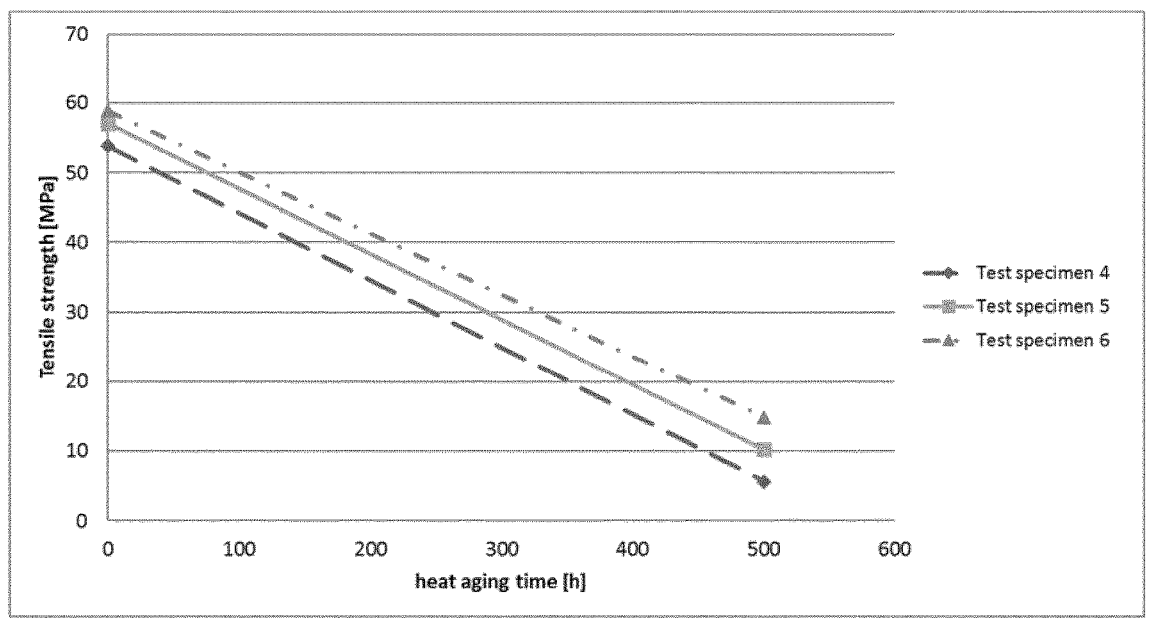
Fig. 1B (190 °C)

THERMAL STABILIZER FOR POLYESTER

The invention relates to a polymeric composition comprising thermoplastic polyester and a rare earth compound. The invention further relates to the use of said rare earth compound as heat stabilizer in a polymeric composition comprising thermoplastic polyester.

BACKGROUND OF THE INVENTION

Polyesters can be classified into two groups: unsaturated polyester resins (UP-resins) and linear thermoplastic polyesters.

UP-resins belong to the group of thermoset plastics and cure exothermically via cross-linking, thus forming irreversible chemical bonds. Cross-linking is mostly done by co-polymerization of a vinyl monomer (e.g. styrene or methyl methacrylate) with polymerizable double bonded polyesters with low molecular weight. These polyesters are mostly synthesized by a poly-condensation reaction of dicarbonyl acids or anhydrides thereof (e.g. maleic anhydride, phthalic anhydride, terephthalic acid), preferable with saturated diols like 1,2-propylene glycol. UP-resins can be applied e.g. as paint, casting resins, as ready to use formulations SMC (Sheet Moulding Compounds) and BMC (Bulk Moulding Compounds), in construction industry, pipes, containers, ship building and automotive industry.

As outlined above, the second group of polyesters are linear thermoplastic polyesters. This group of polyesters melts at an increased temperature, due to the rather weak intermolecular forces formed in the curing process. Due to this property, thermoplasts in general can be reshaped in the molten state (to e.g. bottles). Linear thermoplastic polyesters are synthesized by using bi-functional starting materials, i.e. by poly-condensation of dicarboxylic acids and anhydrides thereof (e.g. therephthalic acid) and diols like ethylene glycol, 1,2-propylene glycol and 1,4-butanediol. As described above, polyesters with low molecular weight are used as a component for the manufacturing of UP-resins, whereas polyesters with high molecular weight are used for the second group of polyesters (i.e. linear thermoplastic polyesters). These high molecular weight polyesters are used for the manufacturing of fibres and for the production of moulding compounds (mainly used in the injection moulding process), with PET (polyethylene terephthalate) and PBT (polybutylene terephthalate) being important examples for the production of moulding compounds on industrial scale.

Thermoplastic polyesters are semi-crystalline polymers showing high hardness, high stiffness, high dimensional stability, low moisture absorption, high chemical resistance against fats and oils, good thermal stability and good electrical properties.

Moulding compounds based on PBT (the melting point of PBT is approximately 220° C.) are characterized by high flowability and high crystallization speed. Therefore, these moulding compounds are mainly used in injection moulding process as components for automotive, electrical and electronic industry. A disadvantage of PBT based moulding compounds is the low resistance against hydrolysis. (Sources: Kunststoffe—E. Forster, K. Lederer: G. Thieme Verlag, Stuttgart (1987), page 123-131 and page 154-157; Kunststoffkompendium Franck Vogelbuch Verlag 3. Auflage, Würzburg (1990), page 185-189; Kunststoffe Ausgabe 10/2017, Carl Hanser Verlag, Munchen, page 66-80; Performance Polyamides Conference, Troy, USA, June 18th-19th 2019, lecture of DSM (title "how do Automotive and Electronics Market Trends impact Polyamides?") and lecture of SOLVAY (power point presentation page 4)

Plastics in general, and thermoplastic polyesters as well, are usually mixed with additives as stabilizers, fillers, plasticizers and colorants to adapt the properties according to the desired field of application.

GB 904,972 A describes polyamides containing hypophosphoric acid and/or a hypophosphate and a water-soluble cerium (III) salt and/or a water-soluble titanium (III) salt as stabilizer. A heat stabilising effect of $Na_2H_2P_2O_6*6H_2O$ in combination with $CeCl_3$ in polyhexamethylene adipamide is mentioned.

The stabilisation of organic polymers against thermal induced degradation by free radicals using cerium dioxide is disclosed in EP 1 832 624 A1.

EP 3 006 506 B1 claims a polyamide molding material comprising at least three components, one being polyamide (e.g. aliphatic polyamide) with a melting temperature of at least 270° C. Optional components are another polymer (e.g. polyester), a flame retardant and an additive (e.g. cerium oxide hydrates as heat stabilizer).

WO 2019/191574 A1 relates to a heat-stabilized polyamide composition comprising a cerium-based heat stabilizer, a second heat stabilizer, a halide additive and a stearate additive.

A process for synthesizing a polyester polyol series product is disclosed in CN 110183638 A. Examples for the used organic polycarboxylic acid or anhydride are PET and PBT.

KR 20170063159 A discloses PBT resins comprising a heat stabilizer, more specifically a phenolic heat stabilizer.

A filler for a high-toughness capacitor film is disclosed in CN 104086877 B. This film is prepared (among several other components) mainly from clay (60-65 parts by weight), 0.7-0.9 parts by weight of PBT resin and 2-3 parts by weight of cerium hydroxide.

CN 108329573 A discloses a plastic comprising (among others) 5-15 parts by weight of PBT and 2-5 parts by weight of cerium hydroxide, wherein the whole composition consists of more than 150 parts.

The usage of antioxidants, heat stabilizers, UV- and light stabilizers in thermoplastic polyester compounds is described in detail in WO 2004/106311. Heat stabilizers like steric hindered phenols, steric hindered amines, phosphites and phosphonites, metal salts—and/or—complex compounds are used as single component, but also in different combinations.

"Plastics Additives Handbook" (H. Zweifel, R. D. Maier, M. Schiller, 6th Edition, Carl Hanser Verlag, Munich, 2009) describes that the combination of phenols and phosphites (added to polyesters) as well as the addition of thiosynergists, which act as hydroperoxide decomposers, to polybutylene terephthalate lead to good results in terms of long term heat stabilization.

In U.S. Pat. No. 9,969,882 B2 it is described that rare earth compounds, preferably cerium tetrahydroxide and lanthanum trihydroxide are used as inorganic radical interceptors in polyamides for long term heat stabilization at temperatures of at least 180° C.

CN 102775635 A discloses the use of cerium hydroxide as heat stabilizer in a silicon rubber product. In this field of use heat stabilization at temperatures of 200° C. and more is required.

For example a rare earth salt of a dicarboxylic acid is described as heat stabilizer of PVC in CN 101200556 B.

CN 106279646 A relates to heat-resistant polybutylene succinate, which comprises a nucleating agent such as, among others, kaolin, mica, titanium dioxide, carbon nanotubes, cyclodextrin or cyclic phosphate lanthane.

U.S. Pat. No. 3,621,074 A discloses a method for polycondensation of a diglycol terephthalate, wherein lanthanum phosphate may be used as a catalyst.

Fire-retardant materials comprising thermoplastic polyester elastomer (TPEE), aluminium phosphinate (A1P) and cerium carbonate hydroxide ($CeCO_3OH$) are disclosed in Yang et al. (2015) Ind. Eng. Chem. Res. 54 (44): 11048-11055.

The requirements in industry are increasing, but the current maximum operation temperature of thermoplastic polyesters is still rather low, e.g. the maximum operation temperature of PBT moulding compositions for longer periods of heat exposure is only about 150° C., leaving a wide temperature range (up to its melting point of 220° C.) in which PBT moulding compositions cannot be applied for longer periods of heat exposure.

SHORT DESCRIPTION OF THE INVENTION

It is the object of the present invention to increase the heat-ageing resistance, especially the long term heat-ageing resistance of thermoplastic polyester.

The object is solved by a polymeric composition comprising a thermoplastic polyester and a rare earth compound selected from the group consisting of lanthanum hydroxide, cerium oxide hydrate and mixtures thereof, characterized in that the amount of the thermoplastic polyester in the polymeric composition is more than 50 wt. %, preferably more than 70 wt. %.

Furthermore, the invention relates to the use of a rare earth compound selected from the group consisting of lanthanum hydroxide, cerium oxide hydrate and mixtures thereof as heat stabilizer in a polymeric composition comprising a thermoplastic polyester, characterized in that the amount of the thermoplastic polyester in the polymeric composition is more than 50 wt. %, preferably more than 70 wt. %.

SHORT DESCRIPTION OF THE FIGURE

FIG. 1A shows the effect of cerium oxide hydrate and lanthanum hydroxide in the inventive polymeric composition on the tensile strength of said polymeric composition at a heat-aging temperature of 170° C.

FIG. 1B shows the effect of cerium oxide hydrate and lanthanum hydroxide in the inventive polymeric composition on the tensile strength of said polymeric composition at a heat-aging temperature of 190° C.

DETAILED DESCRIPTION OF THE INVENTION

The present invention provides in a first aspect a polymeric composition comprising a thermoplastic polyester and a rare earth compound, as well as in a second aspect the use of said rare earth compound as heat stabilizer in a polymeric composition comprising a thermoplastic polyester.

The following disclosure applies similarly to said first aspect and said second aspect.

As the requirements in industry are increasing, it is very desirable to improve the heat-ageing resistance of thermoplastic polyester, especially against heat applied for a long time. Molding compositions with improved heat-ageing resistance can enable the long-term application at higher temperatures, thus increasing the lifespan and reducing the risk of failure. Examples for an application at higher temperatures are electronic components (e.g. connection plug and protective interconnection) for PBT and electronic films for PET.

Improved long term heat-ageing resistance in the context of the present invention shall be understood as a reduction of the percental decrease of mechanical property values upon long term heat-ageing at elevated temperature compared to the initial values before said heat-ageing. Said mechanical property values are preferably Young's modulus, tensile strength and elongation at break.

Heat-ageing, especially long term heat-ageing, in the context of the present invention shall be understood as being induced by objecting the polymeric composition, i.e. the comprised thermoplastic polyester, to an elevated temperature. The elevated temperature is understood to be above the current known maximum operation temperature of the polymeric polyester used according to the invention. The current known maximum operation temperature depends on the type of polymeric polyester, e.g. 150° C. for PBT, and is thus below the melting point or the glass transition temperature, respectively.

One specific aspect of the present invention is to improve the heat-ageing resistance of PBT in a temperature range above 150° C., preferably up to 190° C.

The polymeric compositions according to the invention surprisingly exhibit a very good heat-ageing resistance, especially against long term heat stress. This effect is due to the rare earth compound used according to the present invention. Heat-ageing in general is based on a thermo-oxidative degradation mechanism via radical chain reactions. Due to the influence of heat and oxygen, free radicals form within the polymers. It has been found that the rare earth compounds used according to the present invention are capable of improving heat-ageing resistance of thermoplastic polyesters. Such an effect has not been reported so far for thermoplastic polyester.

According to the present invention, the rare earth compound is selected from the group consisting of lanthanum hydroxide, cerium oxide hydrate and mixtures thereof. Lanthanum hydroxide has a chemical formula of "$La(OH)_3$" and is commonly referred to as "lanthanum hydrate". Cerium oxide hydrate has a chemical formula of "$CeO_2 \cdot nH_2O$", with n typically having a value of up to about 2, and is also referred to as "cerium hydroxide". The number n of $H_2O$ molecules corresponds to the Loss on Ignition (LOI) of the cerium oxide hydrate. The cerium oxide hydrate employed according to the present invention has an LOI of 3.0% to 18.0%.

As well known to the skilled artisan, polymeric compositions may contain significant amounts of additives such as fillers, binders, or reinforcing materials. The polymeric composition may contain a polyester as the sole polymeric component.

The polymeric composition may also contain polymers other than polyester blended with the polyester. Thus, the polyester may be present in a polymer blend. Herein, the term "polymer blend" refers to a physical mixture of two or more different polymers, which polymers are not connected by chemical bonds. The term "polymer blend" does not comprise a "copolymer".

Hereinafter, preferred features of the invention are outlined by the embodiments.

In a preferred embodiment the polymeric composition is characterized in that the thermoplastic polyester is selected from the group consisting of polyethylene terephthalate (PET), polybutylene terephthalate (PBT) and mixtures thereof.

The thermoplastic polyester is preferably polybutylene terephthalate (PBT).

The rare earth compound is more preferably lanthanum hydroxide.

The lanthanum hydroxide has preferably a pH value of 7.5 to 11.5, more preferably of 8.5 to 11.

The lanthanum hydroxide has preferably a specific BET surface of 2 $m^2/g$ to 20 $m^2/g$, more preferably of 6 $m^2/g$ to 13 $m^2/g$.

The lanthanum hydroxide has preferably a D50 of 0.3 μm to 6.0 μm, more preferably of 0.5 μm to 5.0 μm, most preferably 0.7 μm to 3.5 μm.

The lanthanum hydroxide has preferably a LOI of 8.0% to 15.0%, more preferably of 10.0% to 15.0% and most preferably of 12.0% to 14.5%.

In particular the lanthanum hydroxide has all of the above parameters, i.e. specific pH value, BET surface, D50 and LOI.

The characterisation of these parameters of lanthanum hydroxide (i.e. determination of pH value, BET surface, D50 and LOI, respectively) can be carried out according to the test methods described further below.

In a preferred embodiment the polymeric composition is characterized in that the rare earth compound is cerium oxide hydrate.

The cerium oxide hydrate has preferably a pH value of 4 to 11, more preferably of 6 to 8.

The cerium oxide hydrate has preferably a specific BET surface of 30 $m^2/g$ to 250 $m^2/g$, more preferably of 50 $m^2/g$ to 200 $m^2/g$, most preferably 50 $m^2/g$ to 150 $m^2/g$.

The cerium oxide hydrate has preferably a D50 of 0.05 μm to 5.0 μm, more preferably of 0.1 μm to 3.0 μm, most preferably 0.3 μm to 1.5 μm.

The cerium oxide hydrate has a LOI of 3.0% to 18.0%, preferably of 4.0% to 10.0%, even more preferably of 6.0% to 9.0%.

In particular the cerium oxide hydrate has all of the above parameters, i.e. specific pH value, BET surface, D50 and LOI.

The characterisation of these parameters of cerium oxide hydrate (i.e. determination of pH value, BET surface, D50 and LOI, respectively) can be carried out according to the test methods described further below.

EXAMPLES

Example 1

Example 1 describes the compounding step of Ultradur B 4520 with cerium oxide hydrate and lanthanum hydroxide, respectively, for the production of compounding samples 1 to 3.

Compounding sample 1 is not according the invention. Compounding samples 2 and 3 are according to the invention.

Thermoplastic polyester based moulding compounds are available from several suppliers on the market. In example 1 Ultradur B 4520 (non-reinforced grade from BASF) was used. This moulding compound is based on PBT and has good flowability (medium viscosity, suitable for injection moulding process).

Ultradur B 4520 was supplied in pellets. Before the compounding step conditioning of the pellets (drying at 80° C. for 2 h) was necessary.

The incorporation (i.e. the compounding step) of cerium oxide hydrate and respectively of lanthanum hydroxide into Ultradur B 4520 was done by gravimetric feeding using a co-rotating twin screw extruder Coperion ZSK 26 Mcc (from Coperion, Stuttgart). The diameter (D) of the screw was 26 mm. The L(length)/D ratio was 48.

The conditions during the compounding step were as follows:

Throughput=60 kg/h
Speed=600 rpm

Table 1 shows the temperature profile of the heating zones of the ZSK 26 twin screw extruder.

TABLE 1

| | Zone | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Temperature [° C.] | 80 | 250 | 250 | 240 | 240 | 240 | 240 | 240 | 240 | 240 | 240 | 240 |

To achieve a constant mass flow over time of 0.5 wt. % for the cerium oxide hydrate (pH 6.8, BET surface 64.7 $m^2/g$, D50 1.1 μm, LOI 5.5%) or lanthanum hydroxide (pH 9.6, BET surface 8.2 $m^2/g$, D50 3.2 μm, LOI 14.2%) a throughput during the compounding step of >50 kg/h was necessary. For gravimetric feeding two Loss-in-Weight-Brabender dosing units for the basic moulding compound Ultradur B4520 and for the cerium oxide hydrate or lanthanum hydroxide were used.

Two devolatilizing openings were present at the twin screw extruder to remove any remaining humidity during the compounding step.

Using a strand cutter cylindrical pellets with a diameter of around 2 mm and a length of 2 mm to 5 mm were manufactured.

Table 2 shows the manufactured compounding samples 1 to 3.

TABLE 2

| Compounding Sample | Polyester moulding compound | Amount of cerium oxide hydrate [wt. %] | Amount of lanthanum hydroxide [wt. %] |
|---|---|---|---|
| 1 | Ultradur B 4520 | — | — |
| 2 | Ultradur B 4520 | 0.5 | — |
| 3 | Ultradur B 4520 | — | 0.5 |

Example 2

Example 2 describes the production of test specimens 4 to 6 using the compounding samples 1 to 3 produced in example 1. Test specimen 4 was produced from compounding sample 1, test specimen 5 from compounding sample 2 and test specimen 6 from compounding sample 3. Thus, test specimen 4 is not according to the invention. Test specimens 5 and 6 are according to the invention. The production of said test specimens comprises an injection moulding process and a heat ageing process.

First, granules of compounding samples 1 to 3 were dried at 80° C. for 2 h. Tensile test rods (i.e. test specimens 4 to 6) were manufactured using the pre-treated compounding samples 1 to 3 by injection moulding process using the injection moulding machine Engel Victory 330/80 according to DIN EN ISO 527-1.

The heat-ageing process was done in drying ovens at Treibacher Industrie AG. The injection moulded test specimens were subjected to temperatures of 170° C. (drying oven of the company Linn High Therm (type: LHT-ULP 800)) and 190° C. (drying oven of the company Heraeus (type: T5042)) for 500 h.

Example 3

Example 3 describes the mechanical testing of test specimens 4 to 6 produced in example 2.

The test specimens 4 to 6 were conditioned at 72 h at 80° C. in water, dried and cooled down to room temperature overnight.

The mechanical properties of the heat-aged test specimens 4 to 6 was tested at an universal testing machine manufactured by Zwick Z 150 Allround-Linie.

The tensile test, testing the test specimens 4 to 6, was carried out according to DIN EN ISO 527. The speed was 1 mm/min until the yield strength and afterwards 50 mm/min until the break. Young's modulus, tensile strength and elongation at break were determined. Table 3 shows the results of the tensile test. FIG. 1A and FIG. 1B show the results of the tensile test for the tensile strength.

TABLE 3

| Test specimen | Temperature of heat-ageing [° C.] | Duration of heat-ageing [h] | Young's modulus [MPa] | Tensile strength [MPa] | Elongation at break [%] |
|---|---|---|---|---|---|
| 4 (not according to the invention) | — | — | 2320 | 53.8 | 48.3 |
| 4 (not according to the invention) | 170 | 500 | 2550 | 29 | 1.39 |
| 4 (not according to the invention) | 190 | 500 | 2170 | 5.6 | 0.33 |
| 5 (according to the invention) | — | — | 2150 | 57 | 14.71 |
| 5 (according to the invention) | 170 | 500 | 2300 | 51.3 | 2.77 |
| 5 (according to the invention) | 190 | 500 | 2700 | 10.2 | 0.53 |
| 6 (according to the invention) | — | — | 2310 | 58.8 | 15.35 |
| 6 (according to the invention) | 170 | 500 | 2850 | 33.7 | 1.73 |
| 6 (according to the invention) | 190 | 500 | 2620 | 14.8 | 0.73 |

The polymeric compositions according to the invention surprisingly exhibited a very good long term heat-ageing resistance.

The tensile strength quotient (determined as quotient of the tensile strength value before (100%) and after the end of the heat-ageing) after heat-ageing at 170° C. for 500 hours was 90% for test specimen 5, 57% for test specimen 6 and only 54% for test specimen 4. Test specimen 4 was considered as a comparative test specimen as neither cerium oxide hydrate, nor lanthanum hydroxide was added (see Table 2).

The tensile strength quotient after heat-ageing at 190° C. for 500 hours was 18% for test specimen 5 and 25% for test specimen 6, being again an improvement compared with the value of 10% for the test specimen 4.

FIG. 1A (heat aging temperature of 170° C.) and FIG. 1B (heat aging temperature of 190° C.) demonstrate this effect graphically.

The elongation at break quotient (determined as quotient of the elongation at break value before (100%) and after the end of the heat-ageing) after heat-ageing at 170° C. for 500 hours was 19% for test specimen 5, 11% for test specimen 6 and only 2.9% for the test specimen 4. Again, test specimen 4 was considered as a comparative test specimen as neither cerium oxide hydrate, nor lanthanum hydroxide was added (see Table 2). After heat-ageing at 190° C. for 500 hours the elongation at break quotient was 3.6% for test specimen 5 and 4.8% for test specimen 6, compared to only 0.7% for the test specimen 4.

Taken together, the addition of 0.5 wt. % cerium oxide hydrate (test specimen 5) and lanthanum hydroxide (test specimen 6), respectively, to Ultradur B 4520 (a moulding compound based on PBT) lead to a pronounced increase in Young's modulus, tensile strength, elongation at break after heat-ageing at 170° C. and 190° C., respectively, for 500 hours, compared to Ultradur B 4520 without said additions.

Characterisation of Cerium Oxide Hydrate and Lanthanum Hydroxide

In the following the test methods for the characterisation of cerium oxide hydrate and lanthanum hydroxide according to the invention are described.

All analyses were performed in duplicate.

Determination of pH Value

A 10 wt. % slurry of cerium oxide hydrate and lanthanum hydroxide, respectively, in deionized water was prepared and stirred for 30 min. After that, the pH was measured while stirring using a pH-meter at 20° C. (+/−1° C.) (type: SevenExcellence from Mettler Toledo).

Determination of BET Surface

Prior to the measurement 1 g of cerium oxide hydrate was dried at 110° C. with nitrogen purging for 60 min. Prior to the measurement 1 g lanthanum hydroxide was dried at 250° C. with nitrogen purging for 60 min.

The BET surface was determined with a Tristar 3020 surface and porosity analyser (from Micromeritics) using nitrogen as analysis gas.

Determination of Particle Size Distribution D50 by Laser Diffraction Method

D represents the diameter of powder particles. D50 is known as median diameter or medium value of the particle size distribution, being the particle diameter at 50% in the cumulative distribution (e.g. a D50 of 2.0 µm means that 50% of the particles have a smaller diameter than 2.0 µm).

A mixture of cerium oxide hydrate (1 g) and tetra-sodium diphosphate decahydrate (1 ml) was diluted up to 30 ml with deionized water. After shaking the suspension by hand for 30 s, 1 ml was introduced into the (laser particle size analyser (1190L from Cilas). The sample was treated by ultrasound at 50 W for 60 s before reaching the measuring cycle.

Lanthanum hydroxide (~0.5 g) was introduced into the laser particle size analyser as powder. The sample was also treated by ultrasound at 50 W for 60 s prior to the measurement.

Determination of Loss on Ignition

The Loss on Ignition (LOI) was determined with a chamber furnace (type: N11HR from Nabertherm) by heating 20 g of cerium oxide hydrate and lanthanum hydroxide, respectively, from room temperature to 1000° C. with a hold time at 1000° C. for 2 hours.

The invention claimed is:

1. A polymeric composition comprising:
   a thermoplastic polyester and a rare earth compound selected from the group consisting of lanthanum hydroxide, cerium oxide hydrate and mixtures thereof, wherein the amount of the thermoplastic polyester in the polymeric composition is more than 50 wt. %,
   wherein the thermoplastic polyester is polybutylene terephthalate (PBT),
   wherein the rare earth compound comprises at least one of lanthanum hydroxide or cerium oxide hydrate,
   wherein the lanthanum hydroxide, when included, has a pH value of 8.5 to 11, a specific BET surface of 6 $m^2/g$ to 13 $m^2/g$, a D50 of 0.7 µm to 3.5 µm and a LOI of 12.0% to 14.5%, and
   wherein the cerium oxide hydrate, when included, has a pH value of 6 to 8, a specific BET surface of 50 $m^2/g$ to 105 $m^2/g$, a D50 of 0.3 µm to 1.5 µm, and a LOI of 6.0% to 9.0%.

2. The polymeric composition according to claim 1, wherein the amount of the rare earth compound in the polymeric composition is 0.05 wt. % to 5.0 wt. %.

3. The polymeric composition according to claim 1, wherein the rare earth compound acts as heat stabilizer in the polymeric composition.

4. The polymeric composition according to claim 1, wherein the amount of the thermoplastic polyester in the polymeric composition is more than 70 wt. %.

* * * * *